United States Patent [19]
Maggio

[11] Patent Number: 5,939,905
[45] Date of Patent: Aug. 17, 1999

[54] LOOP CONTROL DETECTION CIRCUIT AND METHOD FOR DETECTING CURRENT FEEDBACK

[75] Inventor: Kenneth J. Maggio, Dallas, Tex.

[73] Assignee: Texas Instruments Incorporated, Dallas, Tex.

[21] Appl. No.: 08/919,451

[22] Filed: Aug. 28, 1997

[51] Int. Cl.$^6$ .............................. H03K 5/153; H03K 5/22
[52] U.S. Cl. ........................... 327/76; 327/427; 327/434; 327/77; 327/81
[58] Field of Search .................................. 327/427, 430, 327/431, 434, 538, 543, 74, 76, 77, 78, 79, 80, 81, 87

[56] References Cited

U.S. PATENT DOCUMENTS

| | | | |
|---|---|---|---|
| 3,582,746 | 6/1971 | Nye, Jr. et al. | 318/331 |
| 3,955,130 | 5/1976 | Graf | 318/332 |
| 4,245,167 | 1/1981 | Stein | 307/265 |
| 4,312,075 | 1/1982 | Murano et al. | 375/106 |
| 4,606,052 | 8/1986 | Hirzel et al. | 375/87 |
| 4,721,865 | 1/1988 | Tallaron et al. | 327/77 |
| 4,847,577 | 7/1989 | Gerhart et al. | 328/111 |
| 5,021,937 | 6/1991 | Cohen | 363/41 |
| 5,210,527 | 5/1993 | Smith et al. | 340/659 |
| 5,410,191 | 4/1995 | Miura | 327/227 |
| 5,493,189 | 2/1996 | Ling et al. | 318/254 |
| 5,510,739 | 4/1996 | Caravella et al. | 327/112 |
| 5,532,602 | 7/1996 | Wiget | 324/605 |
| 5,663,667 | 9/1997 | Blum et al. | 327/134 |
| 5,757,214 | 5/1998 | Stoddard et al. | 327/110 |

FOREIGN PATENT DOCUMENTS 0 296 307 A1  10/1988  European Pat. Off. .

*Primary Examiner*—Timothy P. Callahan
*Assistant Examiner*—An T. Luu
*Attorney, Agent, or Firm*—W. Daniel Swayze, Jr.; Wade James Brady, III; Richard L. Donaldson

[57] ABSTRACT

A loop control detection circuit (100) is provided for detecting feedback values in a current feedback control loop to determine if the control loop is in or out of control.

7 Claims, 2 Drawing Sheets

LOOP CONTROL DETECTION CIRCUIT AND METHOD FOR DETECTING CURRENT FEEDBACK

TECHNICAL FIELD OF THE INVENTION

This invention relates generally to the field of control circuitry and more particularly to a loop control detection circuit and method for detecting current feedback.

BACKGROUND OF THE INVENTION

Control loops are used extensively in electronic circuits to monitor and control various values by controlling or regulating electrical quantities, such as currents and voltages. For example, the current through the stator windings of a polyphase direct current ("dc") motor may be controlled using various control loops that regulate the current through the windings during a particular state or commutation.

At certain times and during certain conditions, control loops may lose control and can no longer regulate or control a particular electrical quantity such as a current or voltage. This loss of control may result in undesirable or unpredictable circuit behavior that prevents a circuit from operating as desired. Sometimes, this loss of control can cause a system to completely fail if corrective action is not taken. Problems are further increased when the loss of control of a control loop goes undetected for a period of time.

Oftentimes, the loss of control by a particular control loop, if known, may signify the end of a particular state or event and trigger the initiation of another circuit or control loop to further control or regulate an electrical quantity. If this loss of control is not quickly detected or goes undetected for too long a period of time, overall system performance suffers as other circuits, such as control circuits, cannot be timely implemented. For example, when a commutation occurs in the stator windings of a polyphase direct current motor, current is switched off through one coil and switched on in another coil. The current through the stator winding coils is controlled using control loops having current feedback. Once a current through a coil is switched off, the control loop loses control and the current should be maintained at zero to enhance overall motor performance. Problems arise when the control loop attempts to further control the current through the coil resulting in an undesirable current through the coil.

SUMMARY OF THE INVENTION

From the foregoing it may be appreciated that a need has arisen for a loop control detection circuit and method for detecting current feedback in a control loop to determine whether and when a control loop has lost control or can no longer control or regulate a particular circuitry parameter. In accordance with the present invention, a loop control detection circuit and method for detecting feedback in a control loop are provided which substantially eliminate or reduce the disadvantages and problems encountered when the loss of control by a control loop goes undetected.

According to the present invention, a loop control detection circuit is provided for detecting feedback values in a control loop to determine when a control loop has lost control. The loop control detection circuit includes a comparison circuit and a register circuit. The comparison circuit compares a feedback control loop signal from the control loop to a reference signal and generates, in response, a comparison output signal in a state indicating whether the reference signal is larger than the feedback control loop signal. Alternatively or additionally, the comparison circuit compares a feedback control loop signal from the control loop to a second reference signal and generates, in response, the comparison output signal in a state indicating whether the second reference signal is less than the feedback control loop signal. The register circuit receives a timing signal, such as a commutator control signal, in an enabled state and generates, in response, a loop control detection signal in a state indicating that the control loop is in control. The register circuit also receives the comparison output signal and generates the loop control detection signal in a state indicating that the control loop is out of control in response to receiving the comparison output signal in a state indicating that the reference signal is larger than the feedback control loop signal or in a state indicating that the second reference signal is less than the feedback control loop signal.

The present invention provides various technical advantages. A technical advantage of the present invention includes the ability to determine when a control loop has lost control or can no longer control a circuit parameter. Another technical advantage of the present invention includes the ability to disengage a control loop in response to detecting that the control loop has lost control. This results in improved overall performance and enhanced reliability. Yet another technical advantage of the present invention includes more consistent circuitry performance. Still another technical advantage is the ability to implement additional circuitry, such as additional control circuitry, in response to determining that a control loop has lost control. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
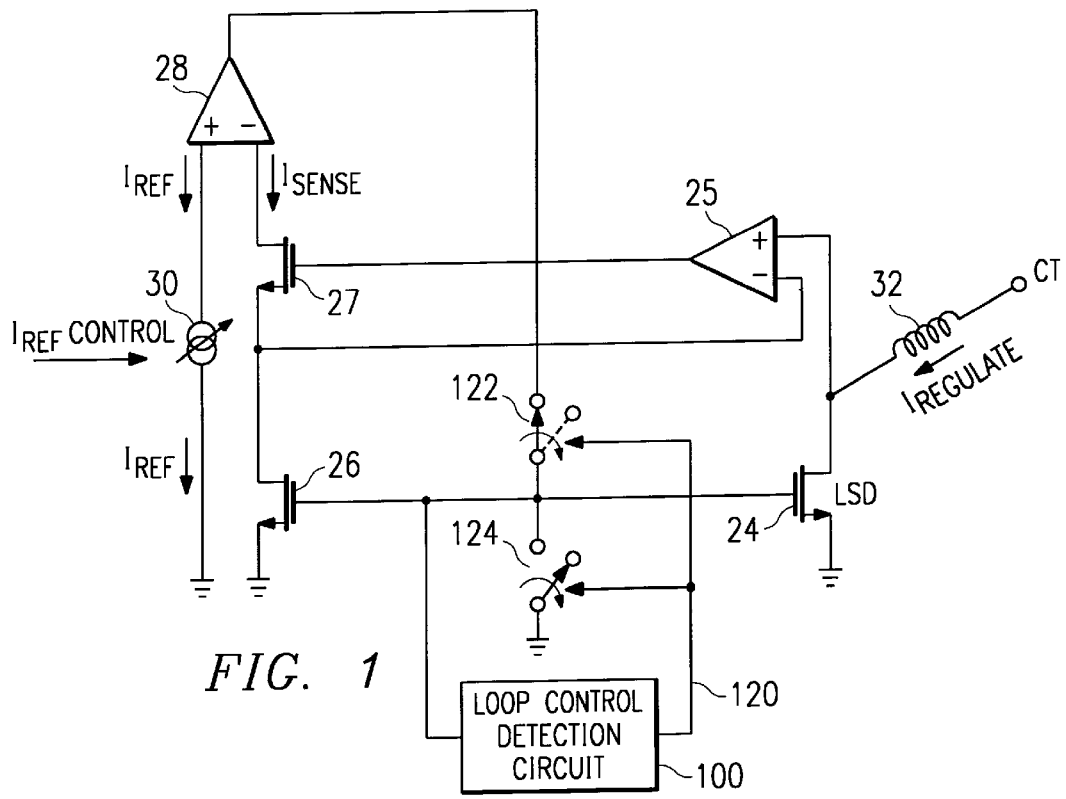
FIG. 1 is a circuit and block diagram of a loop control detection circuit coupled to a control loop.

FIG. 1 is circuit and block diagram of a loop control detection circuit 100 shown coupled to a current feedback control loop that uses current feedback to regulate or control the current through a stator winding coil 32. Stator winding coil 32 may be one phase or coil of a stator winding used in a polyphase dc motor. Loop control detection circuit 100 couples to the gate of a low side driver (LSD) 24 and a sense FET 26 and controls the operation of a disconnect switch 122 and a grounding switch 124 through a loop control detection signal 120. Loop control detection circuit 100 provides disconnect switch 122 in a closed state and grounding switch 124 in an open state when the control loop is controlling or regulating the current $I_{REGULATE}$ through stator winding coil 32. Whenever the control loop loses control or ceases to control $I_{REGULATE}$, loop control detection circuit 100 provides loop control detection signal 120 in an unenabled state such that disconnect switch 122 is provided in an open state and grounding switch 124 is provided in a closed state resulting in the gate of LSD 24 and sense FET 26 being coupled to ground. This effectively disengages the control loop from controlling the current $I_{REGULATE}$ by forcing the gate-to-source voltage of LSD 24 to zero and turning off LSD 24.

The control loop is used to regulate the current $I_{REGULATE}$ through stator winding coil 32 by controlling the gate-to-source voltage of LSD 24. The gate-to-source voltage of LSD 24 is established by the output of a reference amplifier 28. LSD 24, while operating in the saturation region, regulates the current $I_{REGULATE}$ flowing through the drain, source, and channel of LSD 24. The control loop functions by first sensing or mirroring the current $I_{REGULATE}$ which is provided from stator winding coil 32 and through LSD 24. $I_{REGULATE}$ is mirrored through sense FET 26 and is denoted by the current $I_{SENSE}$ as shown in FIG. 1. This is accomplished through the coupling together of the gates of sense FET 26 and LSD 24, and the coupling of their sources to ground. The drains of LSD 24 and sense FET 26 are coupled through a voltage follower arrangement that includes an amplifier 25 and a FET 27. This voltage follower arrangement ensures that the voltage at the drain of LSD 24 and sense FET 26 is maintained at about the same level to ensure that $I_{SENSE}$ is proportional to $I_{REGULATE}$. $I_{SENSE}$ may be referred to as a current feedback value.

$I_{SENSE}$ is provided at some proportional or scaled value of $I_{REGULATE}$ to minimize overall power consumption. This may be accomplished by providing a relatively high ratio between the channel width-to-length ratio of LSD 24 and the channel width-to-length ratio of sense FET 26. For example, a ratio of 1000:1 may be used. Furthermore, although the current feedback control loop shown in FIG. 1 is implemented using n-channel FETs, such as n-channel MOSFETs, the control loop may be implemented using any of a variety of circuit technology and transistor technology such as p-channel FETs and bipolar junction transistors.

The output of reference amplifier 28, which controls the gate-to-source voltage of LSD 24, is generated in the following manner. Reference amplifier 28 receives $I_{SENSE}$ at its inverting terminal and a reference current $I_{REF}$ at its non-inverting terminal. $I_{REF}$ is generated by a reference current source 30 which is controlled through an external control line, denoted as $I_{REF}$ Control, which is provided by circuitry not shown in FIG. 1. $I_{REF}$ Control may be provided by a commutator control circuit that controls the commutation in the stator windings of a polyphase dc motor. Once a commutation occurs, it is often desirable to reduce and maintain a current being provided through a stator winding coil to zero.

Reference current $I_{REF}$ represents the desired or targeted value of $I_{SENSE}$ so that $I_{REGULATE}$ will ultimately be provided at a desired value. Reference amplifier 28 subtracts $I_{SENSE}$ from $I_{REF}$ and multiplies this error value by a gain A to generate an output control signal. Generally, reference amplifier 28 senses the difference between $I_{REF}$ and $I_{SENSE}$ and generates a corresponding output signal that is used to control the gate-to-source voltage of LSD 24 and ultimately $I_{REGULATE}$. By adjusting the gate-to-source voltage of LSD 24, the current $I_{REGULATE}$ through stator winding coil 32 is controlled. Thus, reference amplifier 28 adjusts the gate-to-source voltage of LSD 24 so that $I_{REGULATE}$ is proportional or related to the reference current $I_{REF}$.

While the control loop continues to regulate current $I_{REGULATE}$, loop control detection circuit 100 continues to monitor the gate-to-source voltage provided to LSD 24 and sense FET 26. As long as the control loop is continuing to regulate or control $I_{REGULATE}$, loop control detection circuit 100 generates loop control detection signal 120 in an enabled state. When loop control detection signal 120 is provided in an enabled state, disconnect switch 122 couples the output of reference amplifier 28 to the gates of LSD 24 and sense FET 26 thus allowing the control loop to continue to control the current $I_{REGULATE}$. Grounding switch 124 is provided in an open state while receiving loop control detection signal 120 in an enabled state.

Once loop control detection circuit 100 determines that the control loop can no longer control $I_{REGULATE}$, loop control detection circuit 100 provides loop control detection signal 120 in an unenabled state. As a consequence, disconnect switch 122 is opened and the output of reference amplifier 28 is no longer coupled to the gates of LSD 24 and sense FET 26. The gates of LSD 24 and sense FET are coupled through grounding switch 124 to ground resulting in a gate-to-source voltage of zero. This turns off LSD 24 resulting in $I_{REGULATE}$ going to zero and staying at zero and effectively decoupling or disengaging the current feedback control loop and preventing it from controlling $I_{REGULATE}$. If the output of reference amplifier 28 remained coupled to the gate of LSD 24, unpredictable and undesirable $I_{REGULATE}$ currents may be generated.

Loop control detection circuit 100 determines whether the control circuit can continue to control $I_{REGULATE}$ by determining if the gate-to-source voltage of LSD 24 is below its threshold voltage or if the gate-to-source voltage is provided near or above the supply voltage $V_{CC}$. One embodiment of loop control detection circuit 100 is shown in FIG. 2 and described below.

Figure 2:
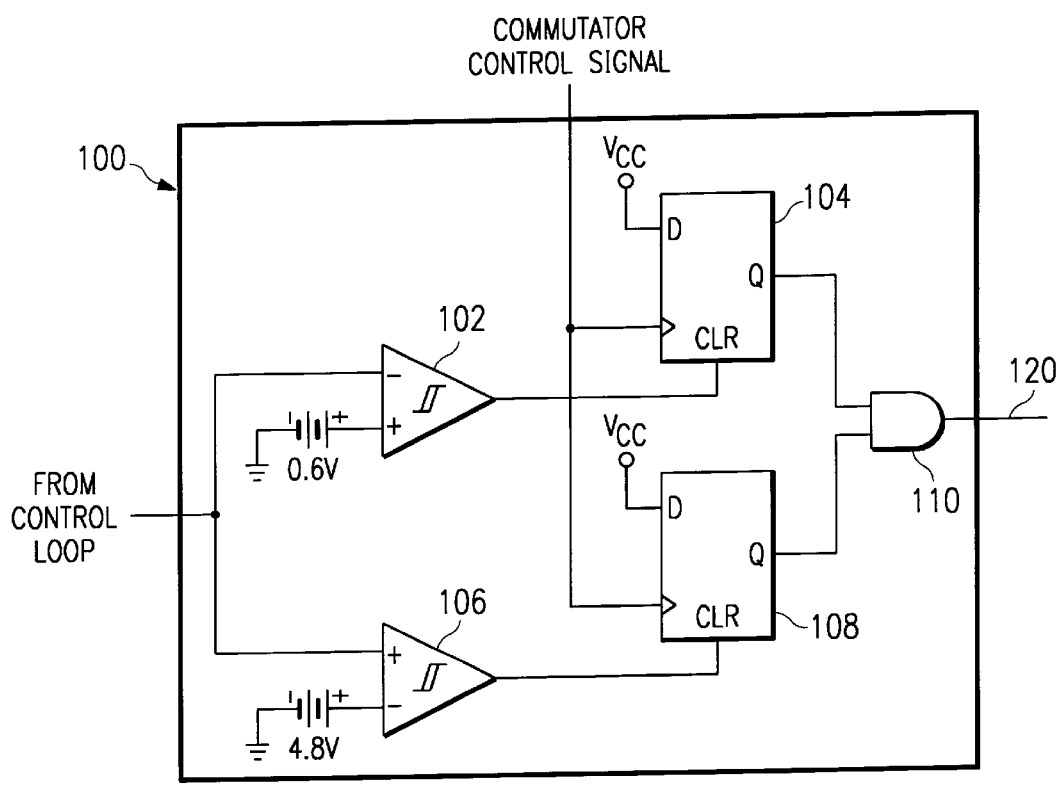
FIG. 2 is a circuit diagram of the loop control detection circuit.

FIG. 2 is a circuit diagram of a loop control detection circuit 100. Loop control detection circuit 100 includes a first comparator 102 coupled to the clear input of a first flip-flop 104, and a second comparator 106 coupled to the clear input of a second flip-flop 108. First comparator 102 and second comparator 106 may be referred to as a comparison circuit while first flip-flop 104 and second flip-flop 108 may be referred to as a register circuit. First flip-flop 104 and second flip-flop 108, in the embodiment shown in FIG. 2, may be implemented using delay or D-type flip-flops. The outputs of first flip-flop 104 and second flip-flop 108 are provided as inputs to an enabling circuit 110 implemented as an "AND" gate. Enabling circuit 110 provides loop control detection signal 120. Loop control detection signal 120 indicates whether the current feedback control loop, shown in FIG. 1, is still regulating a particular circuitry value such as $I_{REGULATE}$. Loop control detection signal 120 may be used to take a desired or appropriate action in response to the detected loss of control as discussed above with respect to disconnect switch 122 and grounding switch 124 of FIG. 1.

First comparator 102 couples to the control loop being monitored at its negative terminal while the positive terminal couples to a reference voltage such as 0.6 volts. In the embodiment of FIG. 2, the negative terminal of first comparator 102, along with the positive terminal of second comparator 106, couple to the gate of LSD 24 and sense FET 26 which provides the gate-to-source voltage of both of these FETs. This voltage may be referred to as a feedback control loop signal. The 0.6 volt reference voltage is designed to correlate to the gate-to-source threshold voltage of LSD 24 such that when the gate-to-source voltage drops below the threshold voltage, LSD 24 is turned off and ceases to control the current $I_{REGULATE}$. Similarly, the negative terminal of second comparator 106 couples to a reference voltage, such as 4.8 volts, that corresponds to the supply voltage $V_{CC}$. If reference amplifier 28 loses control and provides an output at the rail or supply voltage $V_{CC}$, second comparator 106 will detect such an event.

First comparator 102 and second comparator 106 are used to determine when the control loop of FIG. 1 loses control or is no longer controlling the current $I_{REGULATE}$. As a consequence, loop control detection signal 120 will ultimately be provided in an unenabled state indicating the loss of control by the monitored control loop. This is accomplished in the following manner.

Initially, flip-flop 104 and second flip-flop 108 receive a commutator control signal at their clock inputs and $V_{CC}$ at their inputs. The commutator control signal may be referred to as a timing signal and, in this embodiment, indicates whether a commutation has occurred in the stator windings and, as a result, the control loop of FIG. 1 should be enabled to control the current $I_{REGULATE}$ through the stator winding coil 32. As a consequence of receiving the timing signal in an enabled state, first flip-flop 104 and second flip-flop 108 provide the input signal $V_{CC}$ at their output Q which is then provided to enabling circuit 110. As a consequence of both of the outputs of first flip-flop 104 and second flip-flop 108 being provided in an enabled state, enabling circuit 110 initially provides loop control detection signal 120 in an enabled state.

First comparator 102 and second comparator 106 continue to monitor the status of the control loop by continually comparing the gate-to-source voltage of LSD 24 to their respective reference voltage values. It should be understood that, although reference voltage values are used in the present embodiment, other embodiments may use reference currents. First comparator 102 generates a first comparison output signal that is generated and provided in an unenabled state while the gate-to-source voltage of LSD 24 is greater than 0.6 volts. First comparator 102 generates the first comparison output signal in an enabled state when the gate-to-source voltage of LSD 24 is less than 0.6 volts. The first comparison output signal is provided to the clear input of first flip-flop 104. Thus, when the first comparison output signal is provided in an enabled state, the output Q of first flip-flop 104 is cleared. Consequently, loop control detection signal 120 is provided in an unenabled state.

Similarly, if second comparator 106 detects the gate-to-source voltage of LSD 24 at a value greater than the supply voltage $V_{CC}$, such as 4.8 volts, second comparator 106 provides an enabled second comparison output signal to the clear input of second flip-flop 108. Consequently, the output Q of second flip-flop 108 is cleared and provided in an unenabled state. This will also result in enabling circuit 110 providing loop control detection signal 120 in an unenabled state which results in the gate of LSD 24 being coupled to ground and $I_{REGULATE}$ going to zero.

Figure 3:
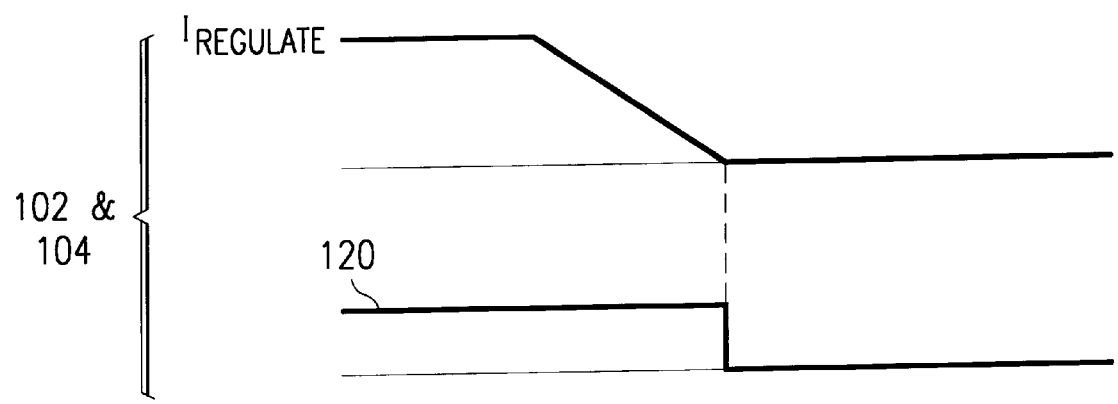
FIG. 3 is a timing and current diagram illustrating the relationship between $I_{REGULATE}$ and a loop control detection signal.
Figure 3:
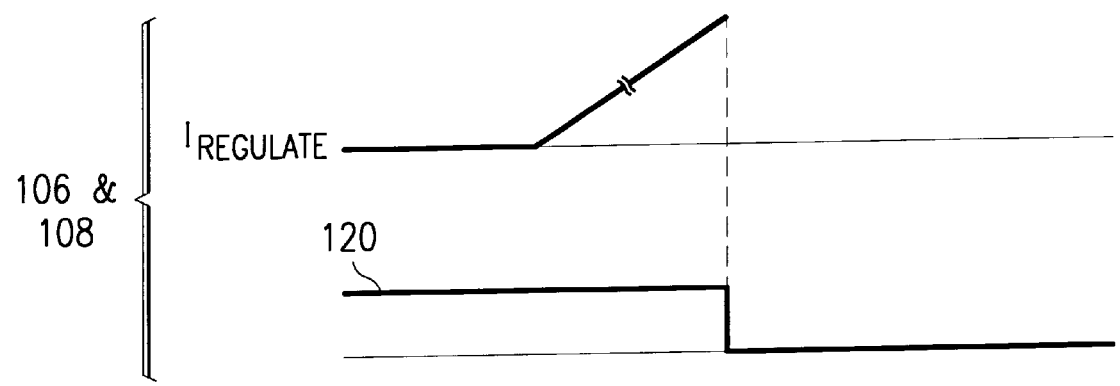

FIG. 3 is a timing and current diagram indicating the relationship between $I_{REGULATE}$ and loop control detection signal 120. At the top of FIG. 3, the current $I_{REGULATE}$ is shown along with loop control detection signal 120. This diagram is intended to illustrate the result of the operation of first comparator 102 and first flip-flop 104 if the gate-to-source voltage of LSD 24 drops below the threshold voltage. $I_{REGULATE}$ is shown initially being provided at a steady state value and then declining to a lower and lower value as the gate-to-source voltage of LSD 24 is reduced which reduces the current $I_{REGULATE}$. As soon as the gate-to-source voltage of LSD 24 drops below the threshold voltage level, first comparator 102 detects this and clears the output Q of first flip-flop 104 in response. This causes loop control detection signal 120 to transition from an enabled state to an unenabled state. Loop control detection signal 120 then causes grounding switch 124, shown in FIG. 1, to close which reduces the gate-to-source voltage of LSD 24 to zero and turns off the control loop circuitry.

The bottom portion of FIG. 3 illustrates the effects of the operation of second comparator 106 and second flip-flop 108 detecting the gate-to-source voltage of LSD 24 exceeding a supply voltage $V_{CC}$. As is shown, $I_{REGULATE}$ is initially provided at a low or zero value and then increases in value until such time as the gate-to-source voltage of LSD 24, which regulates $I_{REGULATE}$, equals or exceeds the supply voltage $V_{CC}$. At such time, reference amplifier 28 provides its output signal at or above the rail or $V_{CC}$ value. This indicates that the control loop has lost control and can no longer effectively control $I_{REGULATE}$. Second comparator 106 and second flip-flop 108 detect this state and provide the output of second flip-flop 108 in an unenabled or cleared state. This results in enabling circuit 110 providing loop control detection signal 120 in an unenabled state which further results in disconnect switch 122 opening and grounding switch 124 closing so that the gate-to-source voltage of LSD 24 and sense FET 26 is provided at zero volts or ground.

Thus, it is apparent that there has been provided, in accordance with the present invention, a loop control detection circuit and method for detecting current feedback that satisfy the advantages set forth above. Although the preferred embodiment has been described in detail, it should be understood that various changes, substitutions, and alterations can be made herein without departing from the scope of the present invention. For example, although the present invention has been illustrated and described with respect to detecting the current feedback in a control loop to determine when the control loop is out of control, the present invention is not limited to detecting only current feedback but instead could be used to detect voltages and other circuitry parameters. The circuits described and illustrated in the preferred embodiment as discrete or separate circuits may be combined into one circuit or split into separate circuits without departing from the scope of the present invention. Furthermore, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. A loop control detection circuit for detecting when a control loop loses control, the loop control detection circuit comprising:

a comparison circuit operable to compare a feedback control loop signal from the control loop to a reference signal and to generate, in response, a comparison output signal in a state indicating whether the reference signal is larger than the feedback control loop signal; and a register circuit operable to receive a timing signal in an enabled state and to generate a loop control detection signal in a state indicating that the control loop is in control in response to receiving the timing signal in an enabled state, the register circuit operable to receive the comparison output signal and to generate the loop control detection signal in a state indicating that the control loop is out of control in response to receiving the comparison output signal in a state indicating that the reference signal is larger than the feedback control loop signal, and wherein the register circuit is operable to receive an input signal and to provide the loop control detection signal at a value corresponding to the input signal in response to receiving the timing signal in an enabled state.

2. A loop control detection circuit for detecting when a control loop loses control, the loop control detection circuit comprising:

a comparison circuit operable to compare a feedback control loop signal from the control loop to a reference signal and to generate, in response, a comparison output signal in a state indicating whether the reference signal is larger than the feedback control loop signal; and a register circuit operable to receive a timing signal in an enabled state and to generate a loop control detection signal in a state indicating that the control loop is in control in response to receiving the timing signal in an enabled state, the register circuit operable to receive the comparison output signal and to generate the loop control detection signal in a state indicating that the control loop is out of control in response to receiving the comparison output signal in a state indicating that the reference signal is larger than the feedback control loop signal, and wherein the control loop controls a current by controlling the gate-to-source voltage of a field-effect transistor, and the feedback control loop signal is the gate-to-source voltage of the field-effect transistor.

3. A loop control detection circuit for detecting when a control loop loses control, the loop control detection circuit comprising:

a comparison circuit operable to compare a feedback control loop signal from the control loop to a reference signal and to generate, in response, a comparison output signal in a state indicating whether the reference signal is larger than the feedback control loop signal; and a register circuit operable to receive a timing signal in an enabled state and to generate a loop control detection signal in a state indicating that the control loop is in control in response to receiving the timing signal in an enabled state, the register circuit operable to receive the comparison output signal and to generate the loop control detection signal in a state indicating that the control loop is out of control in response to receiving the comparison output signal in a state indicating that the reference signal is larger than the feedback control loop signal, wherein the comparison circuit includes a first comparator operable to compare the feedback control loop signal from the control loop to a first reference signal and to generate a first comparison output signal in a state indicating whether the first reference signal is larger than the feedback control loop signal in response, and the register circuit includes a first flip-flop operable to receive the timing signal and to generate a first loop control detection signal in a state indicating that the control loop is in control in response to receiving the timing signal in an enabled state, the first flip-flop operable to receive the first comparison output signal and to generate the first loop control detection signal in a state indicating that the control loop is out of control in response to receiving the first comparison output signal in a state indicating that the first reference signal is larger than the feedback control loop signal, wherein the comparison circuit includes a second comparator operable to compare the feedback control loop signal to a second reference signal and to generate a second comparison output signal in a state indicating whether the feedback control loop signal is larger than the second reference signal in response, and the register circuit includes a second flip-flop operable to receive the timing signal and to generate a second loop control detection signal in a state indicating that the control loop is in control in response to receiving the timing signal in an enabled state, the second flip-flop operable to receive the second comparison output signal and to generate the second loop control detection signal in a state indicating that the control loop is out of control in response to receiving the second comparison output signal in a state indicating that the feedback control loop signal is larger than the second reference signal, the loop control detection circuit further comprising:

an enabling circuit operable to receive the first loop control detection signal from the first flip-flop and the second loop control detection signal from the second flip-flop and to generate the loop control detection signal in a state indicating that the control loop is out of control in response to receiving the first loop control detection signal or the second loop control detection signal in a state indicating that the control loop is out of control, and wherein the enabling circuit is an AND gate.

4. A control circuitry, comprising:

a control loop using current feedback for controlling a current; and a loop control detection circuit including:

a comparison circuit operable to compare a feedback control loop signal from the control loop to a reference signal and to generate a comparison output signal in a state indicating whether the reference signal is larger than the feedback control loop signal in response; and a register circuit operable to receive a timing signal in an enabled state and to generate a loop control detection signal in a state indicating that the control loop is in control in response to receiving the timing signal in an enabled state, the register circuit operable to receive the comparison output signal and to generate the loop control detection signal in a state indicating that the control loop is out of control in response to receiving the comparison output signal in a state indicating that the reference signal is larger than the feedback control loop signal, wherein the control loop controls the current by controlling the gate-to-source voltage of a field-effect transistor, and the feedback control loop signal is the gate-to-source voltage of the field-effect transistor.

5. The control circuitry of claim 4, wherein the loop control detection circuit is operable to open and close a switch to disengage and engage the control loop from the field-effect transistor, the switch operable to engage the control loop when the loop control detection signal is provide in a state indicating that the control loop is in control, and to disengage the control loop when the loop control detection signal is provided in a state indicating that the control loop is out of control.

6. A method for detecting current feedback in a control loop, comprising the steps of:
   comparing a feedback control loop signal related to a current feedback parameter from the control loop to a reference signal;
   generating a comparison output signal in a state indicating whether the reference signal is larger than the feedback control loop signal;
   receiving a timing signal in an enabled state and generating a loop control detection signal in a state indicating that the control loop is in control; and
   generating the loop control detection signal in a state indicating that the control loop is out of control in response to the generation of the comparison output signal in a state indicating that the reference signal is larger than the feedback control loop signal,
   wherein the feedback control loop signal is the gate-to-source voltage of a field-effect transistor.

7. A method for detecting current feedback in a control loop, comprising the steps of:
   comparing a feedback control loop signal related to a current feedback parameter from the control loop to a reference signal;
   generating a comparison output signal in a state indicating whether the reference signal is larger than the feedback control loop signal;
   receiving a timing signal in an enabled state and generating a loop control detection signal in a state indicating that the control loop is in control; and
   generating the loop control detection signal in a state indicating that the control loop is out of control in response to the generation of the comparison output signal in a state indicating that the reference signal is larger than the feedback control loop signal, the method further comprising the step of:
   disengaging the control loop from the circuitry being controlled in response to the generation of the loop control detection signal in a state indicating that the control loop is out of control.

* * * * *

UNITED STATES PATENT AND TRADEMARK OFFICE
CERTIFICATE OF CORRECTION

PATENT NO. : 5,939,905
DATED : August 17, 1999
INVENTOR(S) : Kenneth J. Maggio

It is certified that error appears in the above-identified patent and that said Letters Patent is hereby corrected as shown below:

On the title page, insert the following:

--Related U.S. Application Data
[60] Provisional application No. 60/027,385, Sep. 27, 1996--.

Column 1, line 2, insert the following:
Reference is made to and priority claimed from U.S. Provisional application Ser. No. US60/027,385, filed Sep. 27, 1996.

Signed and Sealed this

Eighth Day of August, 2000

Attest:

Q. TODD DICKINSON

*Attesting Officer*    *Director of Patents and Trademarks*